US011151030B1

(12) United States Patent
Botelho et al.

(10) Patent No.: US 11,151,030 B1
(45) Date of Patent: Oct. 19, 2021

(54) METHOD FOR PREDICTION OF THE DURATION OF GARBAGE COLLECTION FOR BACKUP STORAGE SYSTEMS

(71) Applicant: EMC Corporation, Hopkinton, MA (US)

(72) Inventors: Fabiano C. Botelho, Sunnyvale, CA (US); Mark Chamness, Menlo Park, CA (US); Dmitry Serdyuk, St. Petersburg (RU); Guilherme Menezes, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1450 days.

(21) Appl. No.: 15/252,214

(22) Filed: Aug. 31, 2016

Related U.S. Application Data

(63) Continuation of application No. 13/907,760, filed on May 31, 2013, now Pat. No. 9,460,389.

(51) Int. Cl.
*G06N 20/20* (2019.01)
*G06F 12/02* (2006.01)
(Continued)

(52) U.S. Cl.
CPC .......... *G06F 12/0253* (2013.01); *G06F 3/065* (2013.01); *G06F 3/067* (2013.01); *G06F 3/0608* (2013.01); *G06F 3/0619* (2013.01); *G06F 3/0641* (2013.01); *G06N 20/10* (2019.01); *G06N 20/20* (2019.01); *G06F 2212/702* (2013.01)

(58) Field of Classification Search
CPC .............................. G06N 20/20; G06N 20/00
See application file for complete search history.

(56) References Cited

U.S. PATENT DOCUMENTS 7,904,255 B1 3/2011 Heath et al.
8,751,546 B1 6/2014 Grieve
(Continued)

OTHER PUBLICATIONS

Singer, Jeremy. Geroge Kovoor, Gavin Brown, and Mikel Lujan. "Garbage Collection Auto-Tuning for Java MapReduce on Multi-Cores" 2011 [ONLINE] Downloaded Dec. 10, 2020 https://dl.acm.org/doi/pdf/10.1145/2076022.1993495 (Year: 2011).*

(Continued)

*Primary Examiner* — Ben M Rifkin
(74) *Attorney, Agent, or Firm* — Womble Bond Dickinson (US) LLP

(57) ABSTRACT

A first set of garbage collection (GC) features and non-GC features associated with a storage system are received, the first set of features being associated with a predetermined start date and a time window. A learning equation is generated having a plurality of vectors of GC features and a plurality of vectors of non-GC features. For a current iteration representing a current GC process, it is determined whether a first prior GC process was started within the time window. An entry of vectors of the non-GC features of the learning equation is populated based on corresponding feature values of the first set of non-GC features, in response to determining that the first prior GC process was started within the time window. A predetermined regression algorithm is applied to the learning equation to generate a GC duration predictive model to predict a GC duration of a subsequent GC process.

24 Claims, 10 Drawing Sheets

(51) Int. Cl.
*G06F 3/06* (2006.01)
*G06N 20/10* (2019.01)

(56) References Cited

U.S. PATENT DOCUMENTS

2006/0143595 A1   6/2006   Dostert et al.
2007/0136402 A1   6/2007   Grose et al.

OTHER PUBLICATIONS

Breiman, Leo "Random Forests" 2001 [ONLINE] Downloaded Dec. 10, 2020 https://www.stat.berkeley.edu/~breiman/randomforest2001.pdf (Year: 2001).*

Mitchell, Tom. "Machine Learning" Carnegie Mellon University. 2011 [ONLINE] Downloaded Apr. 21, 2021 https://www.cs.cmu.edu/~tom/10701_sp11/slides/DTreesAndOverfitting-1-11-2011_final.pdf (Year: 2011).*

Liaw, Andy, et al, "Classification and Regression by randomForest," Dec. 2002, <http://ftp3.ie.freebsd.org/pub/download.sourcefore.net/pub/sourceforege/i/ii/iiitbprij1/LiteratureSurvey/Liaw_02_Classfication%20and%20regression%20by%20randomForest.pdf>.

* cited by examiner

METHOD FOR PREDICTION OF THE DURATION OF GARBAGE COLLECTION FOR BACKUP STORAGE SYSTEMS

RELATED APPLICATION

This application is a continuation application of U.S. application Ser. No. 13/907,760, filed May 31, 2013, which is incorporated by reference in its entirety.

FIELD OF THE INVENTION

Embodiments of the present invention relate generally to data storage systems. More particularly, embodiments of the invention relate to prediction of the duration of garbage collection for backup storage systems.

BACKGROUND

Data storage utilization is continually increasing, causing the proliferation of storage systems in data centers. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored. Typically, much of the data remains the same across different snapshots. For example, if the data is backed up for a given user on a daily basis and such user is updating only one of the number of files for a given day, the data in this file is the only data that has been modified. Accordingly, conventional backup operations include the sharing of data across a number of different snapshots/versions to reduce the amount of data being stored.

Furthermore, in some backup systems, the data is not modifiable. In other words, if given data is updated, such data is copied to a different location in the backup storage device (instead of modifying the data at the current location). Over time, all of the storage space in the backup storage device will be allocated, as blocks of data in the backup system are no longer active (but still allocated) and need to be deleted there from. Therefore, garbage collection operations are performed within these backup systems to delete data that is no longer active/referenced, thereby reclaiming unused space in the backup storage device.

Garbage collection (GC) is typically performed on a regular basis (e.g., weekly). When the garbage collection runtime (i.e., duration) is long (e.g., exceeding several days), users/customers call manufacturers of these backup storage devices for support. By predicting these long garbage collection runtimes, backup storage systems manufacturers can proactively notify customers to prevent long garbage collection runtimes.

BRIEF DESCRIPTION OF THE DRAWINGS

Embodiments of the invention are illustrated by way of example, and not as limitations, in the figures of the accompanying drawings in which like references indicate similar elements.

DETAILED DESCRIPTION

Figure 1:
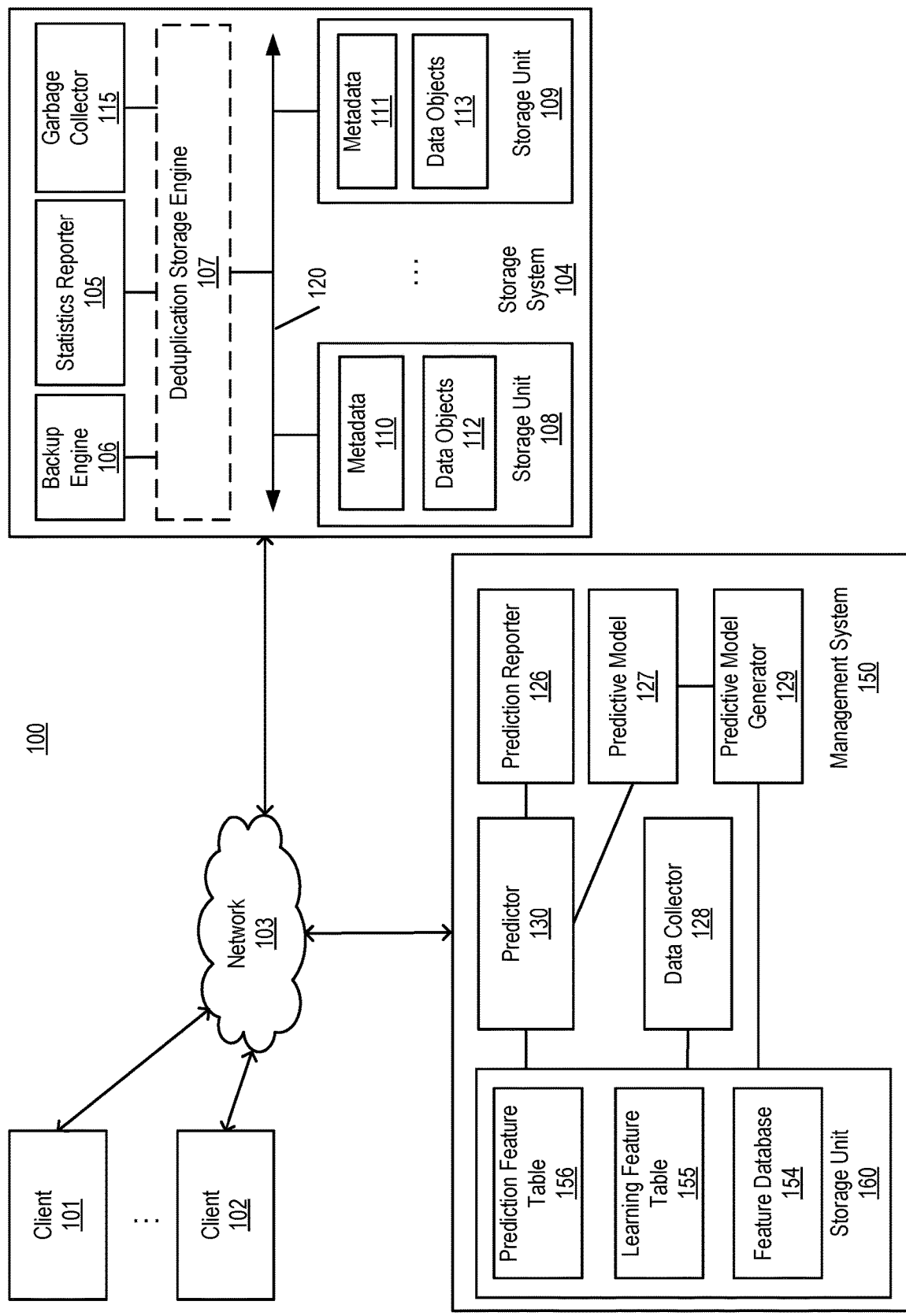
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a data collector periodically collects operating statuses and GC statistics from one or more storage systems. The data collector stores the received operating statuses and GC statistics as features in a feature database, where the features may be extracted from the collected operating statuses and GC statistics. In one embodiment, a predictive model generator is configured to generate a predictive model to predict how long a particular GC process takes to finish. In a particular embodiment, the predictive model generator determines a learning start date and learning window size (e.g., a learning or training period) for learning/generating a predictive model. In such an embodiment, the predictive model generator reads the features stored in the feature database that belong to the determined learning window and generates a learning feature table. Feature values from the learning feature table are used to generate a learning equation or algorithm. In one embodiment, a regression algorithm is applied to the learning equation to generate a predictive model. Depending on how accurate the predictive model is required to be, multiple learning equations may be generated using features from multiple storage systems for the same or different learning windows.

In one embodiment, a GC process is started on a storage system. A predictor reads the features corresponding to the GC process from the feature database and generates a prediction feature table. The predictor uses the prediction feature table to generate a prediction equation. The predictor applies the generated predictive model to the prediction equation to predict a GC duration. In one embodiment, when the predicted GC duration exceeds a predetermined threshold, an alert is generated and sent to various parties, such as an administrator of the respective storage system. In other embodiments, informative alerts are generated and sent to the parties regardless of whether the predicted GC duration exceeds the predetermined threshold.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, storage system 104 includes garbage collector 115 for performing garbage collection (GC). A typical GC process includes ten phases:

1) Pre-enumeration
2) Pre-merge
3) Pre-filter
4) Pre-select
5) Candidate
6) Enumeration
7) Merge
8) Filter
9) Copy
10) Summary The time-consuming phases are the pre-enumeration, enumeration, and copy phase. The copy phase duration depends on how much churn the file system faces since the last successful cleaning cycle rather than the capacity of the system. The pre-enumeration and enumeration phase duration, however, depend on the logical size of the file system. As used herein, logical size refers to the size of all logical files maintained by the storage system prior to deduplication and compression. Garbage collector 115 is typically implemented such that the pre-enumeration and enumeration phases make up approximately half of the GC runtime, and the copy phase makes up approximately the other half of the GC runtime. Typically, the pre-enumeration and enumeration phase each takes approximately one day to complete, and the copy phase takes about two days to complete. Thus, in one embodiment, a pre-enumeration or enumeration phase that goes beyond one day is an indication that the GC process has deteriorated. Alternatively, or in addition to, a combined pre-enumeration and enumeration phase that lasts longer than two days is an indication that the GC process has deteriorated. Alternatively, or in addition to, a total GC runtime that has exceeded four days is an indication that the GC process has deteriorated.

According to one embodiment, storage system 104 further includes statistics reporter 105. Statistics reporter 105 can be implemented in software, firmware, hardware, or any combination thereof. In one embodiment, statistics reporter 105 is configured to monitor operations performed by storage system 104, including periodically (e.g., daily) collecting and transmitting operating statistics data to a remote device such as management system 150 over network 103. In the example illustrated in FIG. 1, storage system 104 may be located at a client/customer site and utilized by a client such as an enterprise or corporation, where storage system 104 may be provided by a storage provider or vendor such as EMC® Corporation. In one embodiment, statistics reporter 105 periodically (e.g., daily) collects GC statistics concerning operations of garbage collector 115 and transmits statistics data representing at least some of the operating statistics to management system 150, where management system 150 is associated with a storage provider or vendor that provides storage system 104 to a client. For example, management system 150 may be operated or owned by the storage provider or alternatively, it may be operated by a third-party vendor on behalf of the storage provider.

According to one embodiment, management system 150 includes data collector 128, predictor 130, predictive model generator 129, predictive model 127, and prediction reporter 126, all of which can be implemented as one or more modules in software, firmware, hardware, or any combination thereof. Management system 150 also includes storage unit 160 for storing feature database 154, learning feature table 155, and prediction feature table 156.

Data collector 128 is employed to communicate with statistics reporter 105 of storage system 104 to periodically collect statistic data concerning operating statuses of garbage collector 115, as well as storage system 104 in general. Although one storage system is shown, data collector 128 can communicate with multiple statistics reporters of multiple storage systems to collect statistic data concerning the respective storage systems. Throughout the description, the mechanisms of the present invention are discussed only with respect to storage system 104 for the sake of clarity, not as a limitation. One having ordinary skill in the art would recognize that these mechanisms can be extended to other storage systems. Storage system 104 and other storage systems may be located at the same or different geographical locations (e.g., same or different client sites). For example, management system 150 may be a centralized management server or cluster of servers for single or multiple clients or customers. Furthermore, data collector 128 may be deployed in one or more separate data collection servers, which may be maintained by the same or different organization as management server 150, where a data collection server periodically collects data from multiple storage systems and sends the collected data to management system 150 for analysis.

The collected statistic data is stored in storage unit 160 as part of feature database 154. Storage unit 160 is shown as part of management system 150 only for illustrative purposes, and not as a limitation of the present invention. One having ordinary skill in the art would recognize that storage unit 160 can be implemented as part of a separate system, as long as management system 150 has access to feature database 154. The collected statistic data stored in feature database 154 may be statistic data collected from one or more storage systems. In one embodiment, the statistic data are collected from a storage system periodically, e.g., on a daily basis. As used herein, "collecting" statistic data can refer to data collector 128 passively receiving statistic data from statistics reporter 105. Alternatively, or in addition to, "collecting" statistic data can refer to data collector 128 actively polling statistic reporter 105 for statistic data.

In one embodiment, the collected statistic data stored in feature database 154 include Central Processing Unit (CPU) statistics, memory statistics, system capacity, compression factor, replication statistics, garbage collection statistics, disk status, etc. The information stored in feature database 154 is described herein only for illustrative purposes. It will be appreciated that in some embodiments, more or less statistic data can be collected and stored in feature database 154.

In one embodiment, predictive model generator (PMG) 129 is configured to process feature database 154 and learn predictive model 127 that is used to predict a total enumeration duration time of a GC process. In one embodiment, PMG 129 is configured to process feature database 154 and generate learning feature table 155 for a given learning start date and learning window. In one embodiment, multiple learning feature table 155 can be generated, each learning feature table 155 based on statistic data from a particular storage system stored in feature database 154. Each of learning feature table 155 is used to generate a respective learning equation. Each learning equation is fed to a regression algorithm (e.g., a random forest algorithm), to learn predictive model 127. The process is repeated multiple times, each time the learning start date is moved back in time. In other words, historical statistic data is used to generate predictive model 127. The number of learning equations that are generated and fed to the regression algorithm depends on system requirements such as how accurate predictive model 127 has to be. The number of learning equations generated can also be limited by available system resources.

Feature database 154 includes statistic data which are collected from many storage systems deployed in the field. In one embodiment, in order to minimize processing resources, PMG 129 is configured to partition statistic data in feature database 154 by a predetermined criteria, such as by storage system model number, by storage system model and release, or by release of the storage system operating system. The partitioning of feature database 154 by such criteria enables PMG 129 to group together systems with similar characteristics or configurations, which improves the accuracy of predictive model 127. Throughout the description, it is assumed that PMG 129 generates predictive model 127 based on feature database 154 that has been partitioned by model number. It will be appreciated, however, that the mechanisms discussed herein are equally applicable in cases where feature database 154 is partitioned based on any other criteria.

In one embodiment, in order to further improve the accuracy of predictive model 127, PMG 129 is further configured to remove noise data from feature database 154. As used herein, noise data refers to statistic data which are from storage systems that are not operating in a typical usage scenario. Noise data includes, for example, but not limited to, statistic data collected from storage systems which are purposely subjected to stress testing (e.g., storage systems operated by the manufacturer which are being subject to quality assurance testing) or storage systems which are underutilized (e.g., less than 10% utilized). Noise data may also include statistic data that are generated a long time ago (e.g., more than one year ago). The mechanisms for generating predictive model 127 are described in further details below.

In one embodiment, predictor 130 is configured to process some or all of statistic data stored in feature database 154 to predict the total enumeration runtime of a GC process being performed at a storage system. In one embodiment, predictor 130 reads statistic data from the respective storage system stored in feature database 154 and generates prediction feature table 156. Predictor 130 applies predictive model 127 to prediction feature table 156 to predict a GC duration of a GC process. In one embodiment, the model 127 is used to predict the total enumeration duration of the GC process being performed at the respective storage system.

In one embodiment, management system 150 further includes prediction reporter 126 configured to send a notification containing the predicted total enumeration duration predicted by predictor 130. In one embodiment, prediction reporter 126 is configured to transmit the notification to a system administrator of the respective storage system. Alternatively, or in addition to, prediction reporter 126 transmits the notification to a manufacturer of the storage systems. In one embodiment, prediction reporter 126 is configured to transmit the notification every time predictor 130 generates a predicted total enumeration duration. In an alternate embodiment, prediction reporter 126 is configured to transmit the notification only when the predicted total enumeration duration exceeds a predetermined threshold. In one embodiment, prediction reporter 126 is configured to automatically generate and send a service ticket to the manufacturer the respective storage system when the predicted total enumeration runtime that exceeds a predetermined threshold.

Throughout the description, references are made to non-GC features. As used herein, non-GC features refer to operating statuses of the storage system, including, for example, the feature "number of files" (which indicates the number of files in the storage system), "pre-compression size" (which indicates the logical file system size of the storage system), "compression ratio" (which is equal to the logical file system size divided by the physical size), "system capacity" (which indicates the total system size), "replication remaining bytes" (which indicates the remaining number of megabytes for replication in the last 24 hours), "replication written bytes" (which indicates the number of megabytes written by replication in the last 24 hours), "one disk failure" (which indicates whether a one disk failure has occurred), "two disk failures" (which indicates whether two disk failures have occurred), and "more than two disk failures" (which indicates whether more than two disk failures have occurred). As used herein, physical size refers to the size of physical space of the storage system used after deduplication and compression have been performed on the logical files.

Throughout the description, references are also made to GC features. As used herein, GC features include the feature "total GC duration" (which indicates the total GC duration of the last completed GC process as of the day the feature value was generated), "copy duration" (which indicates the copy phase duration of the last completed GC process as of the day the feature value was generated), "pre-enumeration duration" (which indicates the pre-enumeration phase duration of the last completed GC process as of the day the feature value was generated), and "enumeration duration" (which indicates the enumeration phase duration of the last completed GC process as of the day the feature value was generated).

Figure 2:
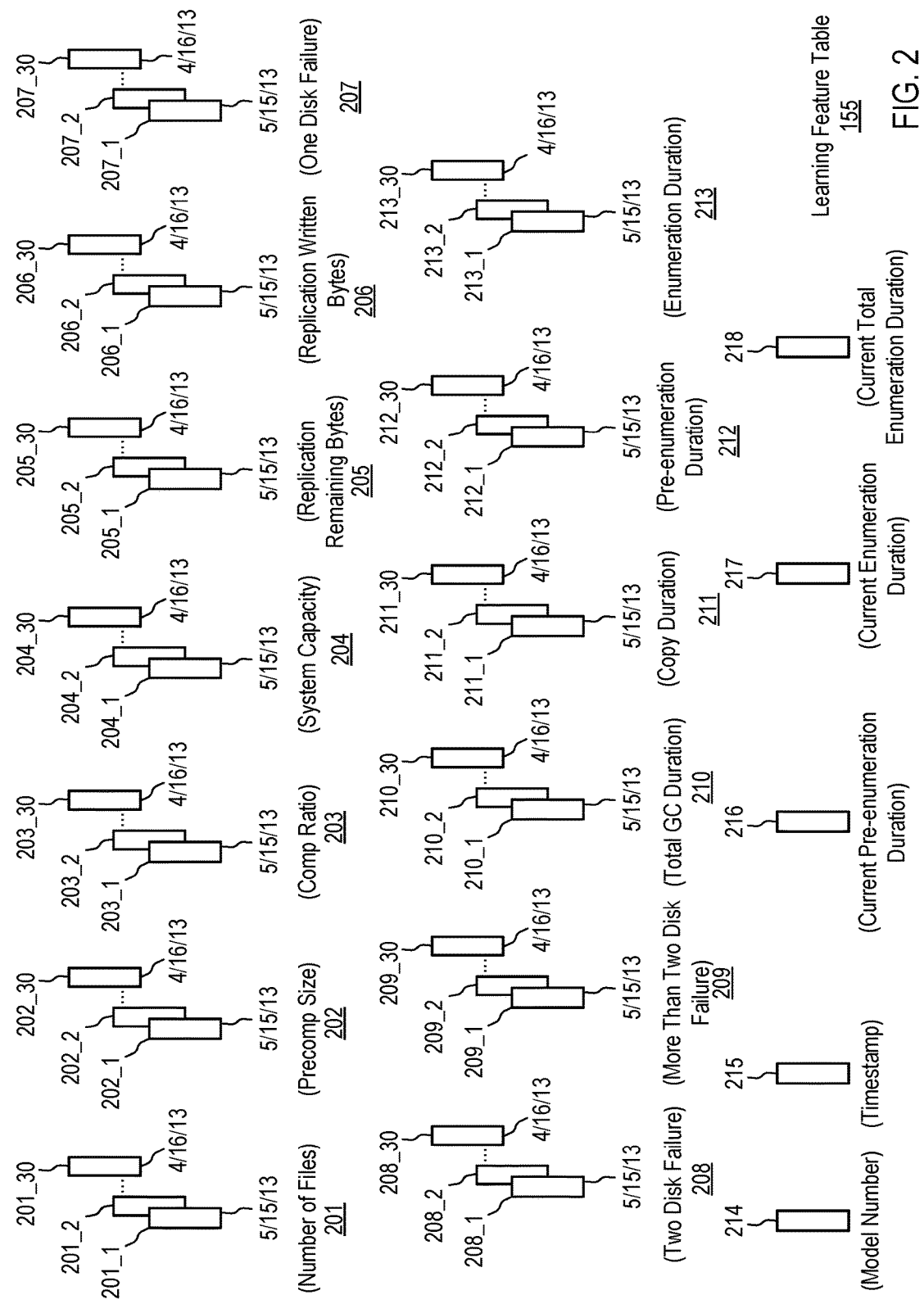
FIG. 2 is a block diagram illustrating a learning feature table according to one embodiment.
Figure 3:
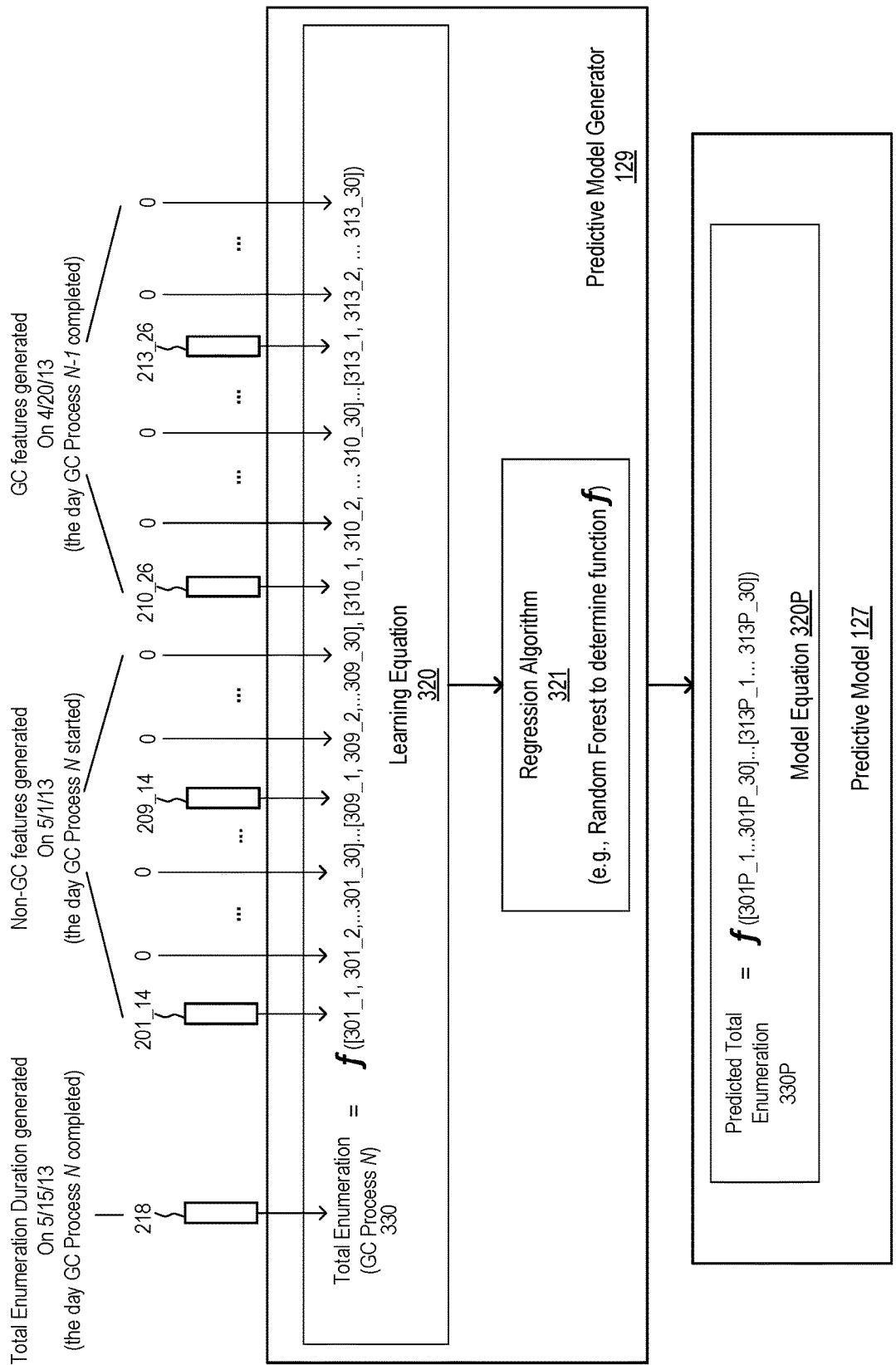
FIG. 3 is a block diagram illustrating a predictive model generator according to one embodiment.

Throughout the description, references are made to dates having the following format "month/date/year". For example, "5/15/13" shall be understood as "May 15, 2013". FIG. 2 is a block diagram illustrating learning feature table 155 according to one embodiment. Learning feature table 155 as illustrated in FIG. 2 assumes a learning start date of May 15, 2013 and a learning window of thirty (30) days. FIG. 2 is discussed in further details below in the text describing FIG. 4. FIG. 3 is a block diagram illustrating PMG 129 according to one embodiment. PMG 129 as illustrated in FIG. 3 assumes a learning start date of May 15, 2013 and a learning window of thirty (30) days. FIG. 3 is discussed in further details below in the text describing FIG. 4.

Figure 4:
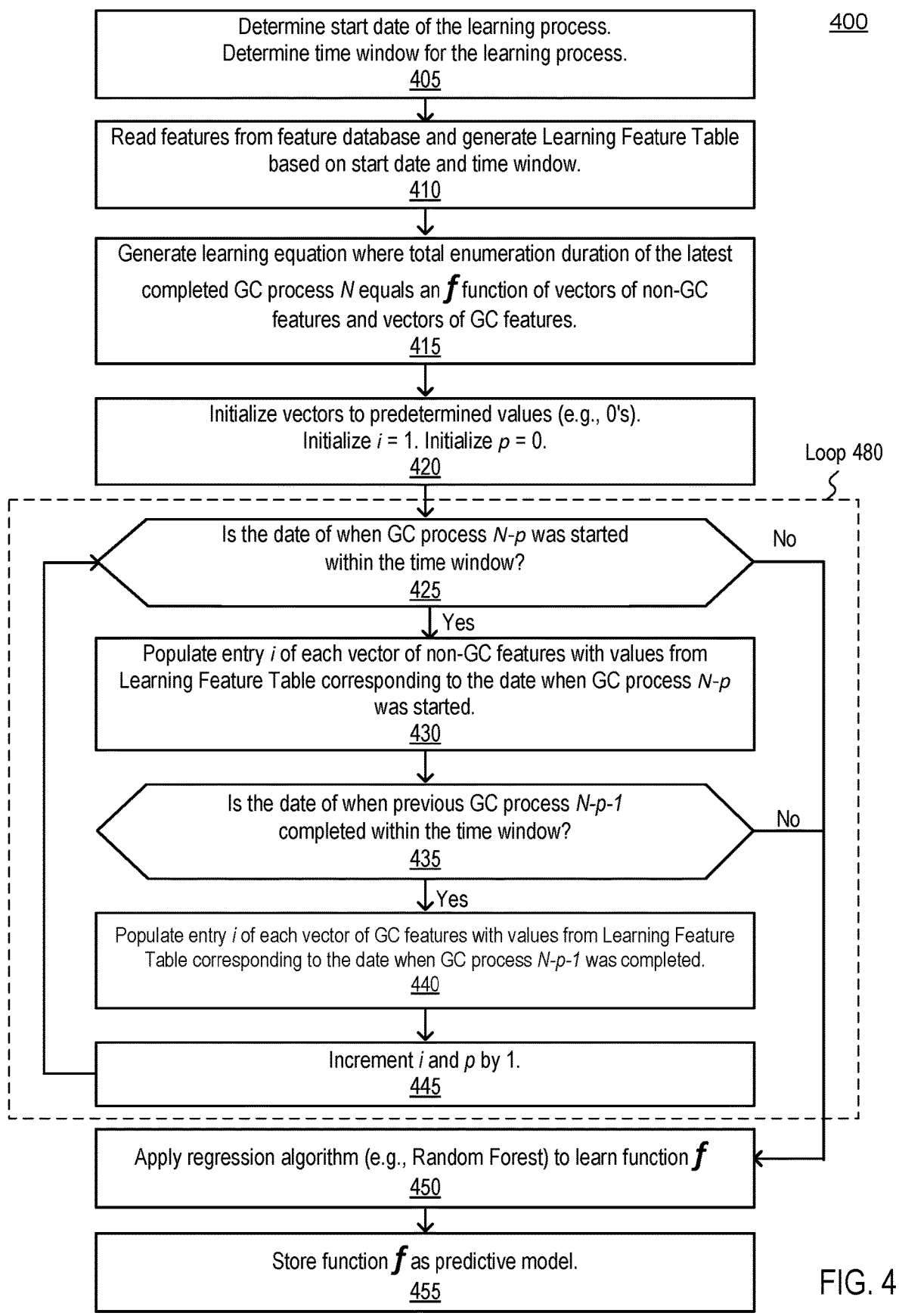
FIG. 4 is a flow diagram illustrating a method for learning a predictive model according to one embodiment.

FIG. 4 is a flow diagram illustrating method 400 for generating a predictive model according to one embodiment. For example, method 400 can be performed by PMG 129, which can be implemented in software, firmware, hardware, or any combination thereof. Method 400 will now be discussed with reference to FIGS. 2-3. The example discussed throughout the description of FIGS. 2-4 assumes that a GC process was started on Apr. 10, 2013 and completed on Apr. 20, 2013; this GC process shall be referred to as GC process N−1. It is further assumed that another GC process was started on May 1, 2013 and completed on May 15, 2013; this GC process shall be referred to as GC process N. Method 400 also assumes that current operating statuses and GC statistics have been periodically received from various storage systems and stored as features in feature database 154.

Referring now to FIG. 4, at block 405, PMG 129 determines the learning start date and learning window size. In one embodiment, in order to optimize the use of the learning window, the learning start date is selected such that it is the date of when a GC process has completed. In the following discussion of method 400, it is assumed PMG 129 has determined the learning start date to be May 15, 2013 (the day GC process N was completed) and the learning window size is thirty (30) days. Thus, the learning end date is Apr. 16, 2013.

At block 410, PMG 129 reads the features from feature database 154 and generates learning feature table 155 as illustrated in FIG. 2. Referring now to FIG. 2, learning feature table 155 includes vectors of features used by PMG 129 to learn predictive model 127. The size of each vector is determined based on the learning window size. In this example, each feature vector includes thirty entries. Each entry is identified by a suffix "_i", where i=1 identifies the first entry which contains the feature value corresponding to the learning start date (i.e., May 15, 2013), and i=30 identifies the last entry which contains the feature value corresponding to the learning end date (i.e., Apr. 16, 2013).

In the embodiment illustrated in FIG. 2, learning feature table 155 includes a vector of feature "number of files" 201 (which indicates the number of files in the storage system). This vector includes thirty feature entries: 201_1 (the first entry) through 201_30 (the last entry). As described above, feature entry 201_1 contains the feature value corresponding to the latest GC run (here, May 15, 2013) and feature entry 201_30 contains the feature value corresponding to a GC run on Apr. 16, 2013 (if any). In one embodiment, the value stored in each entry is the difference between the feature value generated on the day the GC was started and the feature value generated on the day the previous GC run was started. In this example, GC process N−1 was started on Apr. 10, 2013 and GC N was started on May 1, 2013. If both days were within the learning window, then the value of feature entry 201_14 (corresponding to May 1, 2013) would be the value generated on May 1, 2013 minus the value generated on Apr. 10, 2013. The date Apr. 10, 2013, however, is not within the current learning window. In one embodiment, when the previous GC start date is outside the learning window, the feature value for the current GC start date is set to 0. In this example, in such an embodiment, feature entry 201_14 is set to 0. Alternatively, the feature value in such a case is set to the value generated on that day. In this example, in such an embodiment, feature entry 201_14 contains the value generated on May 1, 2013. This same mechanism applies to all non-GC features (201-209).

In the embodiment illustrated in FIG. 2, learning feature table 155 includes a vector of feature "pre-compression size" 202 (which indicates the logical file system size of the storage system). This vector includes thirty feature entries: 202_1 (the first entry) through 202_30 (the last entry). Feature entry 202_1 contains the feature value corresponding to May 15, 2013 and feature entry 202_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "compression ratio" 203 (which is equal to the logical file system size divided by the physical size). This vector includes thirty feature entries: 203_1 (the first entry) through 203_30 (the last entry). Feature entry 203_1 contains the feature value corresponding to May 15, 2013 and feature entry 203_30 contains the feature value corresponding to Apr. 16, 2013. The value stored in each entry is the computed using a similar mechanism to those described above.

In the embodiment illustrated in FIG. 2, learning feature table 155 includes a vector of feature "system capacity" 204 (which indicates the total system size). This vector includes thirty feature entries: 204_1 (the first entry) through 204_30 (the last entry). Feature entry 204_1 contains the feature value corresponding to May 15, 2013 and feature entry 204_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "replication remaining bytes" 205 (which indicates the remaining number of megabytes for replication in the last 24 hours). This vector includes thirty feature entries: 205_1 (the first entry) through 205_30 (the last entry). Feature entry 205_1 contains the feature value corresponding to May 15, 2013 and feature entry 205_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "replication written bytes" 206 (which indicates the number of megabytes written by replication in the last 24 hours). This vector includes thirty feature entries: 206_1 (the first entry) through 206_30 (the last entry). Feature entry 206_1 contains the feature value corresponding to May 15, 2013 and feature entry 206_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "one disk failure" 207 (which indicates whether a one disk failure has occurred). This vector includes thirty feature entries: 207_1 (the first entry) through 207_30 (the last entry). Feature entry 207_1 contains the feature value corresponding to May 15, 2013 and feature entry 207_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "two disk failures" 208 (which indicates whether a two disk failures have occurred). This vector includes thirty feature entries: 208_1 (the first entry) through 208_30 (the last entry). Feature entry 208_1 contains the feature value corresponding to May 15, 2013 and feature entry 208_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "more than two disk failures" 209 (which indicates whether more than two disk failures have occurred). This vector includes thirty feature entries: 209_1 (the first entry) through 209_30 (the last entry). Feature entry 209_1 contains the feature value corresponding to May 15, 2013 and feature entry 209_30 contains the feature value corresponding to Apr. 16, 2013. The value stored in each entry is the computed using a similar mechanism to those described above with respect to feature entry 201.

In the embodiment illustrated in FIG. 2, learning feature table 155 includes a vector of feature "total GC duration" 210 (which indicates the total GC duration of the last completed GC process as of the day this feature value was generated). This vector includes thirty feature entries: 210_1 (the first entry) through 210_30 (the last entry). As described above, feature entry 210_1 contains the feature value corresponding to the latest GC run (here, May 15, 2013) and feature entry 210_30 contains the feature value corresponding to a GC run on Apr. 16, 2013 (if any). In one embodiment, the value stored in each entry is the difference between the feature value generated on the day the GC was completed and the feature value generated on the day the previous GC run was completed. In this example, GC process N−1 was completed on Apr. 20, 2013 and GC N was completed on May 15, 2013. The value of feature entry 210_15 (corresponding to May 15, 2013) is the value generated on May 15, 2013 minus the value generated on Apr. 20, 2013. The value of feature entry 210_26 (corresponding to Apr. 20, 2013) is the value generated on Apr. 20, 2013 minus the value generated on a previously completed GC run (which, in this example, is outside the learning window). In one embodiment, when the previous GC completion date is outside the learning window, the feature value for the current GC completion date is set to 0. In this example, in such an embodiment, feature entry 210_26 is set to 0. Alternatively, the feature value in such a case is set to the value generated on that day. In this example, in such an embodiment, feature entry 210_26 contains the value generated on Apr. 20, 2013. This same mechanism applies to all GC features (210-213).

In the embodiment illustrated in FIG. 2, learning feature table 155 includes a vector of feature "copy duration" 211 (which indicates the copy phase duration of the last completed GC process as of the day this feature value was generated). This vector includes thirty feature entries: 211_1 (the first entry) through 211_30 (the last entry). Feature entry 211_1 contains the feature value corresponding to May 15, 2013 and feature entry 211_30 contains the feature value corresponding to Apr. 16, 2013. The value stored in each entry is the computed using a similar mechanism to those described above with respect to feature entry 210.

In the embodiment illustrated in FIG. 2, learning feature table 155 includes a vector of feature "pre-enumeration duration" 212 (which indicates the pre-enumeration phase duration of the last completed GC process as of the day this feature value was generated). This vector includes thirty feature entries: 212_1 (the first entry) through 212_30 (the last entry). Feature entry 212_1 contains the feature value corresponding to May 15, 2013 and feature entry 212_30 contains the feature value corresponding to Apr. 16, 2013. The value stored in each entry is the computed using a similar mechanism to those described above with respect to feature entry 210.

In the embodiment illustrated in FIG. 2, learning feature table 155 includes a vector of feature "enumeration duration" 213 (which indicates the enumeration phase duration of the last completed GC process as of the day this feature value was generated). This vector includes thirty feature entries: 213_1 (the first entry) through 213_30 (the last entry). Feature entry 213_1 contains the feature value corresponding to May 15, 2013 and feature entry 213_30 contains the feature value corresponding to Apr. 16, 2013. The value stored in each entry is the computed using a similar mechanism to those described above with respect to feature entry 210.

In the embodiment illustrated in FIG. 2, learning feature table 155 includes model number entry 214 which identifies the model number of the storage system that generated the feature values of the vectors described above. In one embodiment, learning feature table 155 also includes timestamp entry 215 which identifies the learning start date (i.e., May 15, 2013). In one embodiment, learning feature table 155 includes feature "current pre-enumeration duration" entry 216 which indicates the pre-enumeration phase duration of the last completed GC process as of the date identified by timestamp 215. Thus, feature entry 216 and feature entry 212_1 correspond to the same day (May 15, 2013), except feature entry 216 contains the "raw" feature value as generated by the storage system, while feature entry 212_1 contains the computed difference as discussed above.

In one embodiment, learning feature table 155 includes feature "current enumeration duration" entry 217 which indicates the enumeration phase duration of the last completed GC process as of the date identified by timestamp 215. Thus, feature entry 217 and feature entry 213_1 correspond to the same day (May 15, 2013), except feature entry 217 contains the "raw" feature value as generated by the storage system, while feature entry 213_1 contains the computed difference as discussed above.

In one embodiment, learning feature table 155 includes feature "current total enumeration duration" entry 218 which indicates the total enumeration duration of the last completed GC process as of the date identified by timestamp 215. Thus, feature entry 218 contains the sum of feature entries 216-217. The features above are described by way of illustration and not a limitation. It will be appreciated that in some embodiments, more or less features may be included in learning feature table 155.

Referring now back to FIG. 4. At block 415, PMG 129 generates a learning equation where the total enumeration duration of the latest completed GC process (i.e., GC process AO equals an $f$ function of the vectors of non-GC features and vectors of GC features. FIG. 3 illustrates by way of example and not a limitation, learning equation 320, where total enumeration 330 equals $f$ function of feature vectors 301 through 313 (illustrated as features 301_1 through 313_30). Feature vectors 301 through 313 correspond to the same features as feature vectors 201 through 213. For example, feature 301 is the "number of files" feature. In one embodiment, the non-GC features include features 301 through 309, and GC features include features 310 through 313. In this example, PMG 129 stores the value of feature 218 as total enumeration 330. The features used in learning equation 320 are shown for illustrative purposes. One having ordinary skill in the art would recognize that other features can be used without departing from the broader scope and spirit of the present invention.

Referring now back to FIG. 4. At block 420, PMG 129 initializes feature vectors 301 through 313 to "0". PMG 129 also initializes variable i and p to "0". Method 400 includes loop 480, which comprises the operations of blocks 425 to 445. Each time loop 480 is performed (i.e., for each value of i), an entry of feature vectors 301-313 is updated. In other words, each time loop 480 is performed, 301_i, 302_i, 303_i, 304_i, 305_i, 306_i, 307_i, 308_i, 309_i, 310_i, 311_i, 312_i, and 313_i may be updated.

The first iteration of loop 480 (where i=1 and p=0) will now be discussed. At block 425, PMG 129 determines if the date of when GC process N-p was started is within the learning window. If so, PMG 129 proceeds to block 430. Otherwise, PMG 129 proceeds to block 450. During the first iteration, PMG 129 determines that GC process N was started on May 1, 2013, which is within the learning window (May 15, 2013-Apr. 16, 2013), and proceeds to block 430.

At block 430, PMG 129 populates entry i of each vector of non-GC features 301-309 with values from learning feature table 155 corresponding to the date when GC process N-p was started. For example, during the first iteration, PMG 129 determines that GC process N was started on May 1, 2013. The non-GC feature entries of learning feature table 155 which correspond to the date May 1, 2013 are: 201_14, 202_14, 203_14, 204_14, 205_14, 206_14, 207_14, 208_14, 209_14. Accordingly, PMG 129 populates feature entries 301_1, 302_1, 303_1, 304_1, 305_1, 306_1, 307_1, 308_1, 309_1 with the values from feature entries 201_14, 202_14, 203_14, 204_14, 205_14, 206_14, 207_14, 208_14, 209_14, respectively.

At block 435, PMG 129 determines if the date of when a previous GC process N-p-1 completed is within the learning window. If so, PMG 129 proceeds to block 440. Otherwise, PMG 129 proceeds to block 450. During the first iteration, PMG 129 determines that the previous GC process N-1 was completed on Apr. 20, 2013, which is within the learning window (May 15, 2013-Apr. 14, 2015), and proceeds to block 440.

At block 440, PMG 129 populates entry i of each vector of GC features 310-313 with values from learning feature table 155 corresponding to the date when GC process N-p-1 was completed. During the first iteration, PMG 129 determines that GC process N-1 was completed on Apr. 20, 2013. The GC feature entries of learning feature table 155 which correspond to the date Apr. 20, 2013 are: 210_26, 211_26, 212_26, and 213_26. Accordingly, PMG 129 populates feature entries 310_1, 311_1, 312_1, 313_1 with the values from feature entries 210_26, 211_26, 212_26, and 213_26, respectively.

At block 445, PMG 129 increments variables i and p by 1, and loops back to block 425 to perform a second iteration of loop 480. The second iteration of loop 480 (where i=2 and p=1) will now be discussed. During the second iteration, PMG 129 determines that GC process N-1 was started on Apr. 10, 2013, which is not within the learning window (May 15, 2013-Apr. 16, 2013), and proceeds to block 450. Thus, entries 2-30 of feature vectors 301-313 are not updated (i.e., they continue to contain the initial values of "0").

At block 450, PMG 129 applies a regression algorithm (e.g., random forest algorithm) to learning equation 320 to learn function $f$. At block 455, PMG 129 stores the learned function $f$ as part of predictive model 127. For example, as illustrated in FIG. 3, the output of regression algorithm 321 is stored as model equation 320P in which predicted total enumeration 330P equals the learned $f$ function of vectors of feature "number of files" 301P, "pre-compression size" 302P, "compression ratio" 303P, "system capacity" 304P, "replication remaining bytes" 305P, "replication written bytes" 306P, "one disk failure" 307P, "two disk failure" 308P, "more than two disk failure" 309P, "total GC duration" 310P, "copy duration" 311P, "pre-enumeration duration" 312P, and "enumeration duration" 313P.

Depending on how accurate predictive model 127 needs to be, method 400 may be performed multiple times. For example, method 400 may be performed again using the same learning start date and same learning window size, but with feature values from a different storage system having the same model number. For example, at block 410, PMG 129 can read the features from feature database 154 that were generated by a different storage system. In addition, method 400 can also be performed by using a different learning start date. For example, at block 405, PMG 129 can select the next learning start date to be the completion date of the next latest GC process. For example, PMG 129 can select the next learning start date to be Apr. 20, 2013 because it corresponds to the completion date of GC process N-1.

Figure 5:
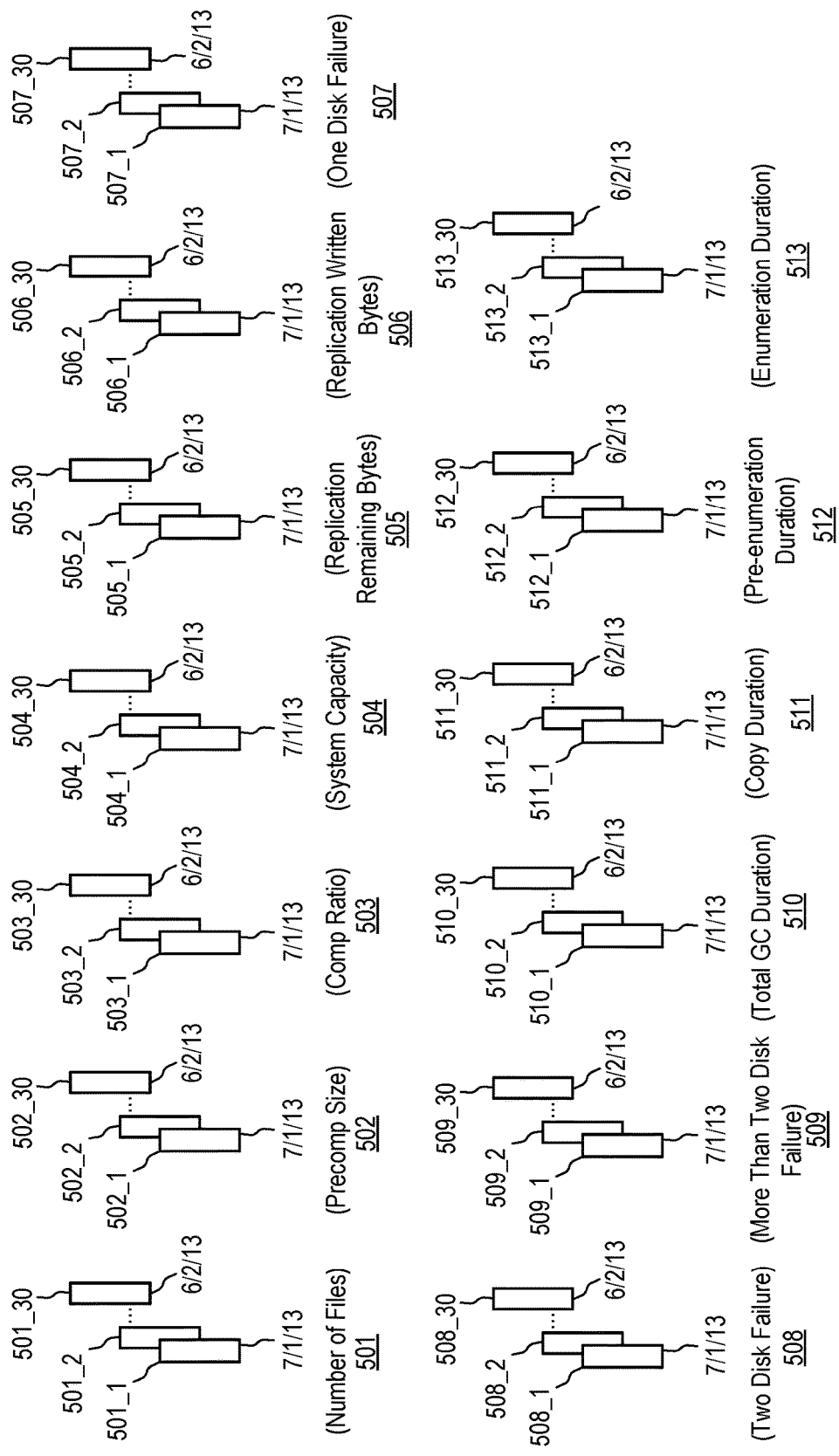
FIG. 5 is a block diagram illustrating a prediction feature table according to one embodiment.
Figure 6:
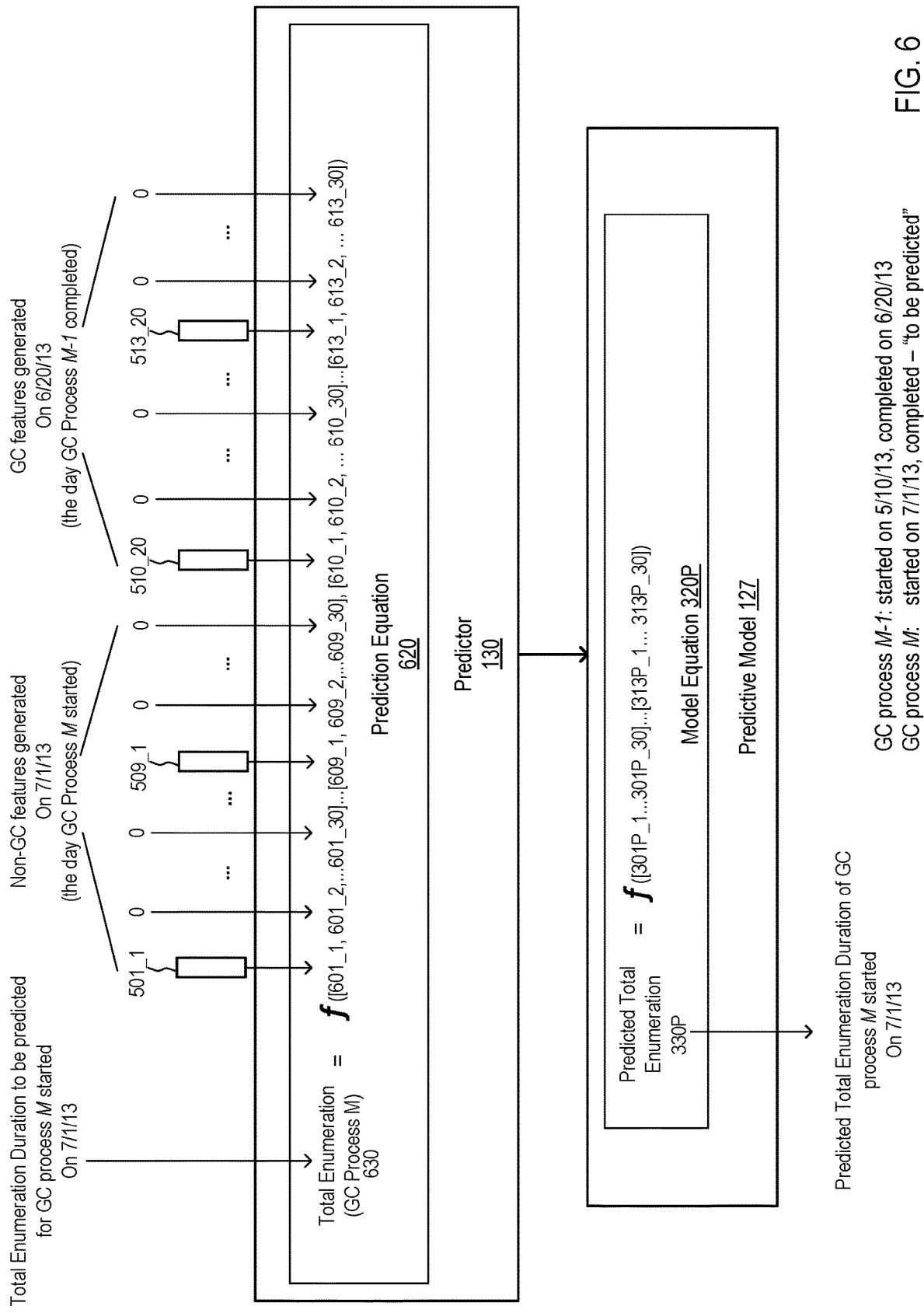
FIG. 6 is a block diagram illustrating a predictor according to one embodiment.

FIG. 5 is a block diagram illustrating prediction feature table 156 according to one embodiment. Prediction feature table 156 as illustrated in FIG. 5 assumes a prediction start date of Jul. 1, 2013 and a prediction window of thirty (30) days. FIG. 5 is discussed in further details below in the text describing FIG. 7. FIG. 6 is a block diagram illustrating predictor 130 according to one embodiment. Predictor 130 as illustrated in FIG. 6 assumes a prediction start date of Jul. 1, 2013 and a prediction window of thirty (30) days. FIG. 6 is discussed in further details below in the text describing FIG. 7.

Figure 7:
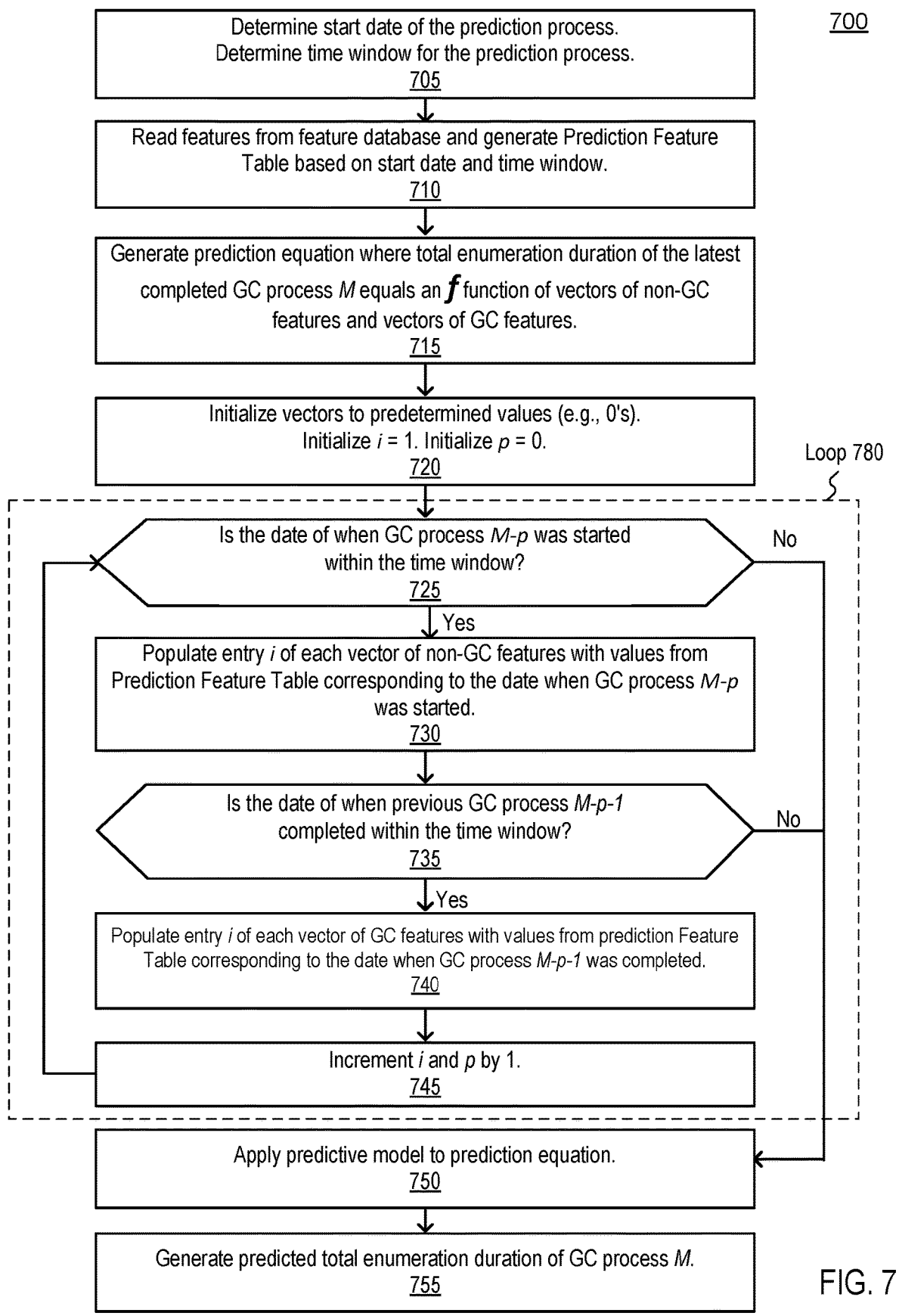
FIG. 7 is a flow diagram illustrating a method for predicting total enumeration duration according to one embodiment.

FIG. 7 is a flow diagram illustrating method 700 for predicting a total enumeration duration according to one embodiment. For example, method 700 can be performed by predictor 130, which can be implemented in software, firmware, hardware, or any combination thereof. Method 700 will now be discussed with reference to FIGS. 5-6. The example discussed throughout the description of FIGS. 5-7 is for a prediction of a GC process M being performed by storage system 104. The example assumes that a GC process was started by storage system 104 on May 10, 2013 and completed by storage system 104 on Jun. 20, 2013; this GC process shall be referred to as GC process M-1. It is further assumed that the latest GC process was started by storage system 104 on Jul. 1, 2013 (this is the process for which the prediction is being made); this GC process shall be referred to as GC process M. Method 700 also assumes that current operating statuses and GC statistics have been received from storage system 104 and stored as features in feature database 154.

Referring now to FIG. 7, at block 705, predictor 130 determines the prediction start date and prediction window size. In one embodiment, the prediction start date is the date of when a GC process has started. In the following discussion of method 700, it is assumed predictor has determined the prediction start date to be Jul. 1, 2013 (the day GC process M was started) and the prediction window size is thirty (30) days. Thus, the prediction end date is Jun. 2, 2013.

At block 710, predictor 130 reads the features from feature database 154 and generates prediction feature table 156 as illustrated in FIG. 5. Referring now to FIG. 5, prediction feature table 156 includes vectors of features used by predictor 130 to predict the total enumeration duration of GC process M started on Jul. 1, 2013. The size of each vector is determined based on the prediction window size. In this example, each feature vector includes thirty entries. Each entry is identified by a suffix "_i", where i=1 identifies the first entry which contains the feature value corresponding to the prediction start date (i.e., Jul. 1, 2013), and i=30 identifies the last entry which contains the feature value corresponding to the prediction end date (i.e., Jun. 2, 2013).

In the embodiment illustrated in FIG. 5, learning feature table 156 includes a vector of feature "number of files" 501 (which indicates the number of files in the storage system). This vector includes thirty feature entries: 501_1 (the first entry) through 501_30 (the last entry). As described above, feature entry 501_1 contains the feature value corresponding to the latest GC run (here, Jul. 1, 2013) and feature entry 501_30 contains the feature value corresponding to a GC run on Jun. 2, 2013 (if any). The mechanisms for determining the values to be stored in each non-GC feature entry are similar to those described above with respect to feature entry 201 of FIG. 2.

In the embodiment illustrated in FIG. 5, prediction feature table 156 includes a vector of feature "pre-compression size" 502 (which indicates the logical file system size of storage system 104). This vector includes thirty feature entries: 502_1 (the first entry) through 502_30 (the last entry). Feature entry 502_1 contains the feature value corresponding to Jul. 1, 2013 and feature entry 502_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "compression ratio" 503 (which is equal to the logical file system size divided by the physical size). This vector includes thirty feature entries: 503_1 (the first entry) through 503_30 (the last entry). Feature entry 503_1 contains the feature value corresponding to Jul. 1, 2013 and feature entry 503_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "system capacity" 504 (which indicates the total system size). This vector includes thirty feature entries: 504_1 (the first entry) through 504_30 (the last entry). Feature entry 504_1 contains the feature value corresponding to Jul. 1, 2013 and feature entry 504_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "replication remaining bytes" 505 (which indicates the remaining number of megabytes for replication in the last 24 hours). This vector includes thirty feature entries: 505_1 (the first entry) through 505_30 (the last entry). Feature entry 505_1 contains the feature value corresponding to Jul. 1, 2013 and feature entry 505_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "replication written bytes" 506 (which indicates the number of megabytes written by replication in the last 24 hours). This vector includes thirty feature entries: 506_1 (the first entry) through 506_30 (the last entry). Feature entry 506_1 contains the feature value corresponding to Jul. 1, 2013 and feature entry 506_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "one disk failure" 507 (which indicates whether a one disk failure has occurred). This vector includes thirty feature entries: 507_1 (the first entry) through 507_30 (the last entry). Feature entry 507_1 contains the feature value corresponding to Jul. 1, 2013 and feature entry 507_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "two disk failures" 508 (which indicates whether a two disk failures have occurred). This vector includes thirty feature entries: 508_1 (the first entry) through 508_30 (the last entry). Feature entry 508_1 contains the feature value corresponding to Jul. 1, 2013 and feature entry 508_30 contains the feature value corresponding to Jun. 2, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "more than two disk failures" 509 (which indicates whether more than two disk failures have occurred). This vector includes thirty feature entries: 509_1 (the first entry) through 509_30 (the last entry). Feature entry 509_1 contains the feature value corresponding to Jul. 1, 2013 and feature entry 509_30 contains the feature value corresponding to Apr. 16, 2013. The mechanisms for determining the values to be stored in each non-GC feature entry are similar to those described above with respect to feature entry 201 of FIG. 2.

In the embodiment illustrated in FIG. 5, prediction feature table 156 includes a vector of feature "total GC duration" 510 (which indicates the total GC duration of the last completed GC process as of the day this feature value was generated). This vector includes thirty feature entries: 510_1 (the first entry) through 510_30 (the last entry). Feature entry 510_1 contains the feature value corresponding to Jul. 1, 2013 and feature entry 510_30 contains the feature value corresponding to Jun. 2, 2013. The mechanisms for determining the values to be stored in each GC feature entry are similar to those described above with respect to feature entry 210 of FIG. 2.

In the embodiment illustrated in FIG. 5, prediction feature table 156 includes a vector of feature "copy duration" 511 (which indicates the copy phase duration of the last completed GC process as of the day this feature value was generated). This vector includes thirty feature entries: 511_1 (the first entry) through 511_30 (the last entry). Feature entry 511_1 contains the feature value corresponding to Jul. 1, 2013 and feature entry 511_30 contains the feature value corresponding to Jun. 2, 2013. The mechanisms for determining the values to be stored in each GC feature entry are similar to those described above with respect to feature entry 210 of FIG. 2.

In the embodiment illustrated in FIG. 5, prediction feature table 156 includes a vector of feature "pre-enumeration duration" 512 (which indicates the pre-enumeration phase duration of the last completed GC process as of the day this feature value was generated). This vector includes thirty feature entries: 512_1 (the first entry) through 512_30 (the last entry). Feature entry 512_1 contains the feature value corresponding to Jul. 1, 2013 and feature entry 512_30 contains the feature value corresponding to Jun. 2, 2013. The mechanisms for determining the values to be stored in each GC feature entry are similar to those described above with respect to feature entry 210 of FIG. 2.

In the embodiment illustrated in FIG. 5, prediction feature table 156 includes a vector of feature "enumeration duration" 513 (which indicates the enumeration phase duration of the last completed GC process as of the day this feature value was generated). This vector includes thirty feature entries: 513_1 (the first entry) through 513_30 (the last entry). Feature entry 513_1 contains the feature value corresponding to Jul. 1, 2013 and feature entry 513_30 contains the feature value corresponding to Jun. 2, 2013. The mechanisms for determining the values to be stored in each GC feature entry are similar to those described above with respect to feature entry 210 of FIG. 2. The features above are described by way of illustration and not a limitation. It will be appreciated that in some embodiments, more or less features may be included in prediction feature table 156.

Referring now back to FIG. 7. At block 715, predictor 130 generates a prediction equation where the predicted total enumeration duration of the GC process (i.e., GC process M) equals an $f$ function of the vectors of non-GC features and vectors of GC features. FIG. 6 illustrates by way of example and not a limitation, prediction equation 620, where predicted total enumeration 630 equals $f$ function of feature vectors 601 through 613 (illustrated as features 601_1 through 613_30). Feature vectors 601 through 613 correspond to the same features as feature vectors 501 through 513. For example, feature 601 is the "number of files" feature. In one embodiment, the non-GC features include features 601 through 609, and GC features include features 610 through 613. The features used in prediction equation 620 are shown for illustrative purposes. One having ordinary skill in the art would recognize that other features can be used without departing from the broader scope and spirit of the present invention.

Referring now back to FIG. 7. At block 720, predictor 130 initializes feature vectors 601 through 613 to "0". Predictor 130 also initializes variable i and p to "0". Method 700 includes loop 780, which comprises the operations of blocks 725 to 745. Each time loop 780 is performed (i.e., for each value of i), an entry of feature vectors 601-613 is updated. In other words, each time loop 780 is performed, 601_i, 602_i, 603_i, 604_i, 605_i, 606_i, 607_i, 608_i, 609_i, 610_i, 611_i, 612_i, and 613_i may be updated.

The first iteration of loop 780 (where i=1 and p=0) will now be discussed. At block 725, predictor 130 determines if the date of when GC process M-p was started is within the prediction window. If so, predictor 130 proceeds to block 730. Otherwise, predictor 130 proceeds to block 750. During the first iteration, predictor 130 determines that GC process M was started on Jul. 1, 2013, which is within the prediction window (Jul. 15, 2013-Jun. 2, 2013), and proceeds to block 730.

At block 730, predictor 130 populates entry i of each vector of non-GC features 601-609 with values from prediction feature table 156 corresponding to the date when GC process M-p was started. For example, during the first iteration, predictor 130 determines that GC process M was started on Jul. 1, 2013. The non-GC feature entries of prediction feature table 156 which correspond to the date Jul. 1, 2013 are: 501_1, 502_1, 503_1, 504_1, 505_1, 506_1, 507_1, 508_1, and 509_1. Accordingly, predictor 130 populates feature entries 601_1, 602_1, 603_1, 604_1, 605_1, 606_1, 607_1, 608_1, and 609_1 with the values from feature entries 501_1, 502_1, 503_1, 504_1, 505_1, 506_1, 507_1, 508_1, and 509_1, respectively.

At block 735, predictor 130 determines if the date of when a previous GC process M-p-1 completed is within the prediction window. If so, predictor 130 proceeds to block 740. Otherwise, predictor 130 proceeds to block 750. During the first iteration, predictor 130 determines that the previous GC process M-1 was completed on Jun. 20, 2013, which is within the prediction window (Jul. 1, 2013-Jun. 2, 2015), and proceeds to block 740.

At block 740, predictor 130 populates entry i of each vector of GC features 610-613 with values from prediction feature table 156 corresponding to the date when GC process M-p-1 was completed. During the first iteration, predictor 130 determines that GC process M-1 was completed on Jun. 20, 2013. The GC feature entries of prediction feature table 156 which correspond to the date Jun. 20, 2013 are: 510_20, 511_20, 512_20, and 513_20. Accordingly, predictor 130 populates feature entries 610_1, 611_1, 612_1, 613_1 with the values from feature entries 510_20, 511_20, 512_20, and 513_20, respectively.

At block 745, predictor 130 increments variables i and p by 1, and loops back to block 725 to perform a second iteration of loop 780. The second iteration of loop 780 (where i=2 and p=1) will now be discussed. During the second iteration, predictor 130 determines that GC process M-1 was started on May 10, 2013, which is not within the prediction window (Jul. 1, 2013-Jun. 2, 2013), and proceeds to block 750. Thus, entries 2-30 of feature vectors 601-613 are not updated (i.e., they continue to contain the initial values of "0"). At block 750, predictor 130 applies the learned function $f$ of predictive model 127 to prediction equation 620 and generates the predicted total enumeration duration at block 755.

In one embodiment, the total GC duration can be calculated by adding the predicted enumeration duration and a predicted copy duration. In one embodiment, the copy duration is predicted to be the same value as the predicted total enumeration duration because typically each makes up about half of the total GC duration as described above.

Figure 8:
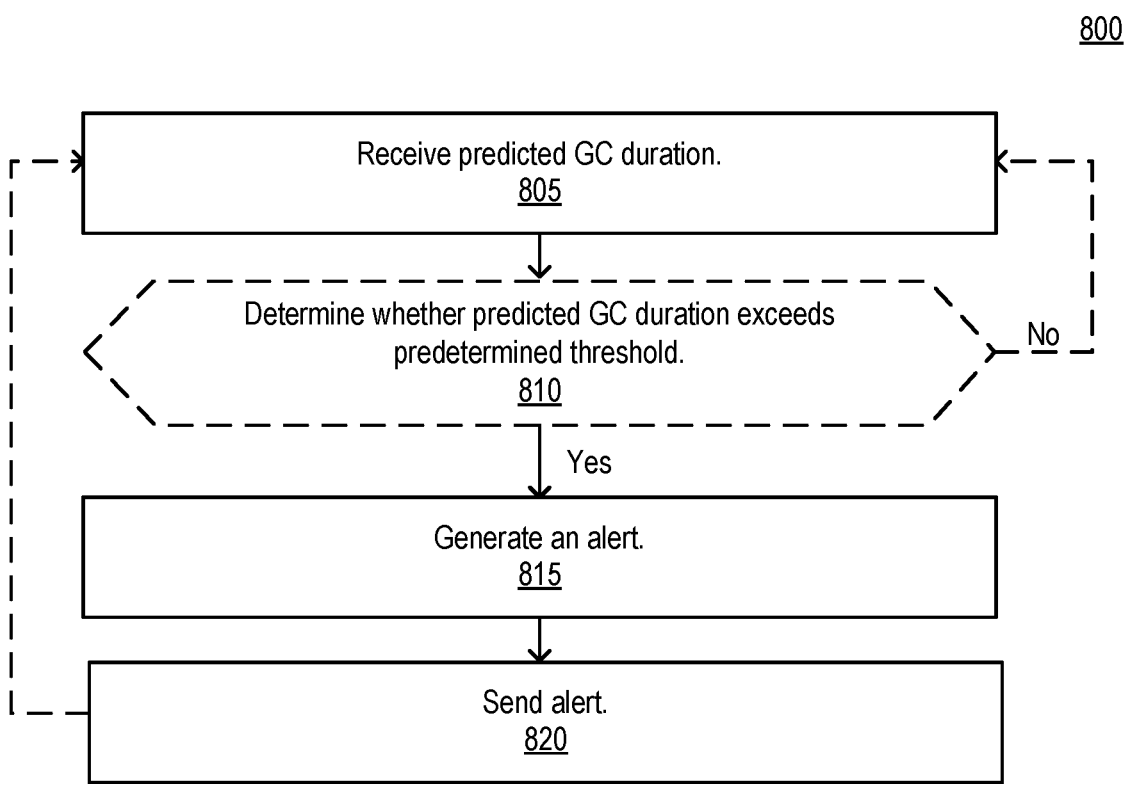
FIG. 8 is a flow diagram illustrating a method for generating and sending an alert according to one embodiment.

FIG. 8 is a flow diagram illustrating method 800 for sending an alert to an administrator of a storage system according to one embodiment. For example, method 800 can be performed by prediction reporter 126, which can be implemented in software, firmware, hardware, or any combination thereof. Referring now to FIG. 8, at block 805, prediction reporter 126 receives a predicted GC duration from predictor 130 and transitions to optional block 810.

At optional block 810, prediction reporter 126 determines if the predicted GC duration exceeds a predetermined threshold (indicating the respective GC process may deteriorate). If so, prediction reporter 126 proceeds to block 815. Otherwise, prediction reporter 126 returns to block 805 and waits for another prediction from predictor 130. In the embodiment where optional block 810 is not implemented, prediction reporter 126 always transitions from block 805 directly to block 815.

At block 815, prediction reporter 126 generates an alert to indicate the respective GC process may deteriorate. In one embodiment, the alert indicates the severity of the GC deterioration. For example, the alert can include various severity levels including critical, major, or minor. The severity level is determined by how much the predicted GC duration exceeds the predetermined threshold. In one embodiment, the alert can also be generated with no severity level, but rather as an informative alert. For example, in embodiments where optional block 810 is not implemented, an informative alert may be generated even though the predicted GC duration does not exceed the predetermined threshold. Such an informative alert would inform the administrator of the predicted GC duration.

At block 820, prediction reporter 126 sends the alert. In one embodiment, the alert can be sent to different parties by different means for different levels of predicted GC deterioration. For a minor GC deterioration, the alert can be an email to the administrator of the respective storage system. For a major GC deterioration, the alert can be a text message or an automatic call to the administrator of the respective storage system. For a critical GC deterioration, in addition to informing the administrator of the storage system, the alert can automatically generate a service request to the manufacturer of the manufacturer of the respective storage system.

Figure 9:
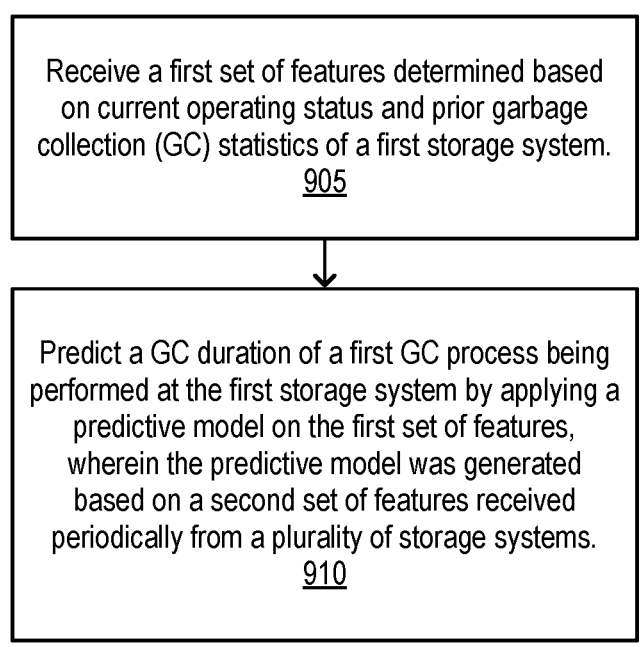
FIG. 9 is a flow diagram illustrating a method for predicting a GC duration according to one embodiment.

FIG. 9 is a flow diagram illustrating method 900 for predicting a GC duration according to one embodiment. For example, method 900 may be performed by various modules of management system 150, which may be implemented as one or more modules in software, firmware, hardware, or any combination thereof.

At block 905, data collector 128 receives a first set of features determined based on current operating status (e.g., non-GC features) and prior garbage collection (GC) statistics (e.g., GC features) of a first storage system (e.g., storage system 104).

At block 910, predictor 130 predicts a GC duration of a first GC process being performed at the first storage system by applying a predictive model (e.g., predictive model 127) on the first set of features, wherein the predictive model was generated based on a second set of features received periodically from a plurality of storage systems.

Figure 10:
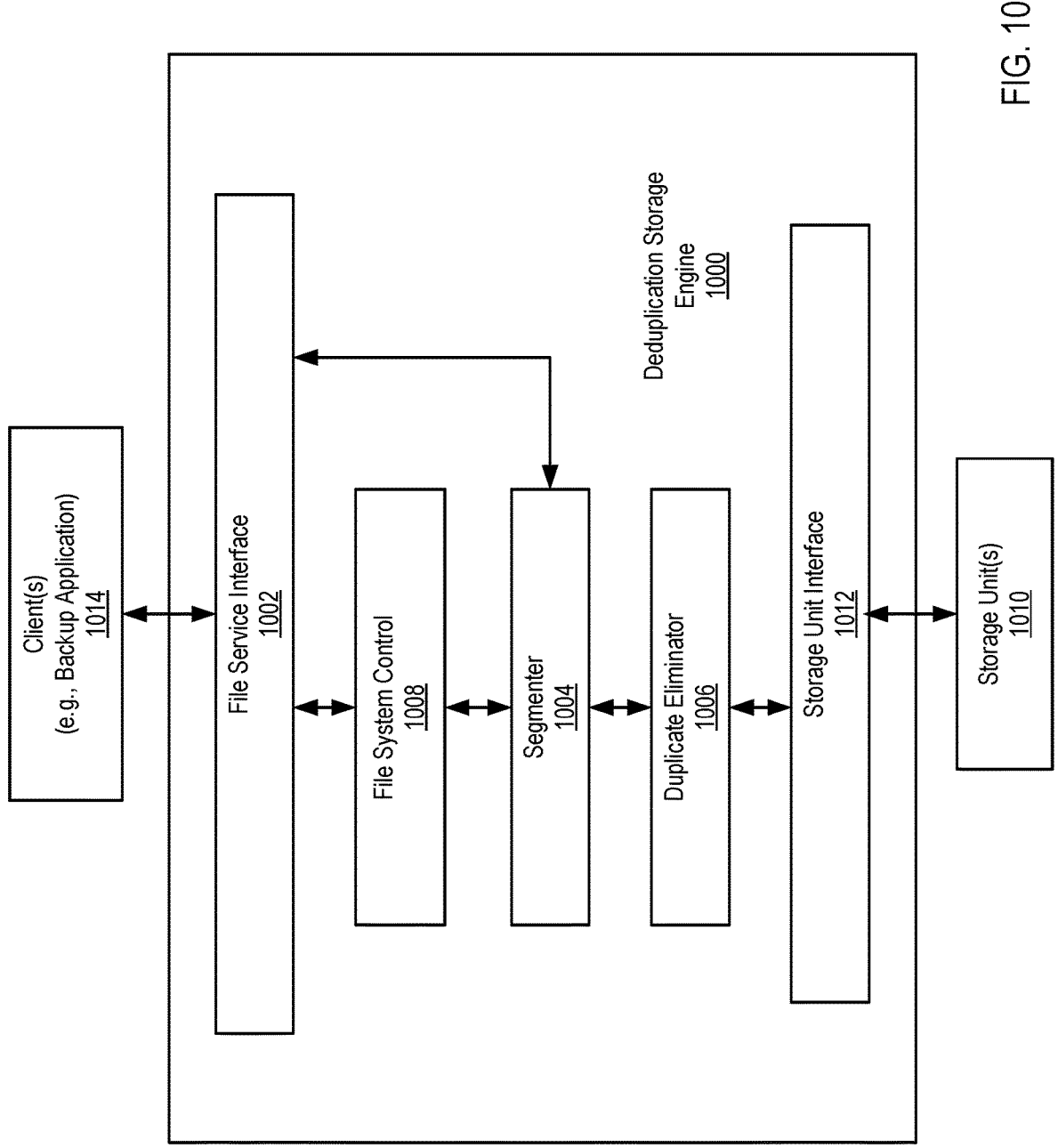
FIG. 10 is a block diagram illustrating a deduplicated storage system according to one embodiment.

FIG. 10 is a block diagram illustrating a chunk storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An electronic device (e.g., a computer, an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining a garbage collection duration of a storage system, the method comprising:
    receiving a first set of garbage collection (GC) features and non-GC features associated with a storage system from a feature database, the first set of features being associated with a predetermined start date and a time window;
    determining a learning equation, wherein the learning equation defines a function $f$ between a total enumeration duration of the latest completed GC process and a plurality of vectors of GC features and a plurality of vectors of non-GC features;
    iteratively performing following operations:
        for a current iteration representing a current GC process, determining whether a first prior GC process was started within the time window, and
        populating an entry of vectors of the non-GC features of the learning equation based on corresponding feature values of the first set of non-GC features, in response to determining that the first prior GC process was started within the time window;
    applying a predetermined regression algorithm to the learning equation to learn the function $f$ of the learning equation, the function $f$ being used to generate a GC duration predictive model, wherein the GC duration predictive model is utilized to predict a GC duration of a subsequent GC process; and
    removing noise data from the feature database, wherein the noise data include statistic data collected from storage systems that are subjected to a stress testing and are underutilized.

2. The method of claim 1, wherein iteratively performing further comprises:
    determining whether a date when a second prior GC process was completed is within the time window; and
    populating an entry of vectors of the GC features of the learning equation based on corresponding feature values of the first set of GC features, in response to determining that the second prior GC process was completed is within the time window.

3. The method of claim 2, wherein the second prior GC process was performed before the first prior GC process.

4. The method of claim 1, wherein each vector of features comprises a plurality of vector entries, each vector entry corresponding to one of a plurality of days within the time window.

5. The method of claim 1, wherein the first set of garbage collection (GC) features and non-GC features is one of a plurality of sets of GC features and non-GC features determined based on prior operating statistics and GC processes of the storage system at different points in time.

6. The method of claim 1, wherein the non-GC features include at least one of: a number of files, a pre-compression size, a compression ratio, a storage system capacity, a number of replication bytes remaining, a number of replication bytes written, and an indicator of whether one or more disk failures have occurred.

7. The method of claim 1, wherein the GC features include at least one of: a total GC duration, a copy duration, a pre-enumeration duration, and an enumeration duration of GC processes performed at a plurality of storage systems.

8. The method of claim 1, wherein the regression algorithm is a random forest algorithm.

9. A non-transitory machine-readable medium having instructions stored therein, which when executed by a processor, cause the processor to perform operations of determining a garbage collection duration of a storage system, the operations comprising:
    receiving a first set of garbage collection (GC) features and non-GC features associated with a storage system from a feature database, the first set of features being associated with a predetermined start date and a time window;
    determining a learning equation, wherein the learning equation defines a function $f$ between a total enumeration duration of the latest completed GC process and a plurality of vectors of GC features and a plurality of vectors of non-GC features;
    iteratively performing following operations:
        for a current iteration representing a current GC process, determining whether a first prior GC process was started within the time window, and
        populating an entry of vectors of the non-GC features of the learning equation based on corresponding feature values of the first set of non-GC features, in response to determining that the first prior GC process was started within the time window;
    applying a predetermined regression algorithm to the learning equation to learn the function $f$ of the learning equation, the function $f$ being used to generate a GC duration predictive model, wherein the GC duration predictive model is utilized to predict a GC duration of a subsequent GC process; and
    removing noise data from the feature database, wherein the noise data include statistic data collected from storage systems that are subjected to a stress testing and are underutilized.

10. The machine-readable medium of claim 9, wherein iteratively performing further comprises:
    determining whether a date when a second prior GC process was completed is within the time window; and populating an entry of vectors of the GC features of the learning equation based on corresponding feature values of the first set of GC features, in response to determining that the second prior GC process was completed is within the time window.

11. The machine-readable medium of claim 10, wherein the second prior GC process was performed before the first prior GC process.

12. The machine-readable medium of claim 9, wherein each vector of features comprises a plurality of vector entries, each vector entry corresponding to one of a plurality of days within the time window.

13. The machine-readable medium of claim 9, wherein the first set of garbage collection (GC) features and non-GC features is one of a plurality of sets of GC features and non-GC features determined based on prior operating statistics and GC processes of the storage system at different points in time.

14. The machine-readable medium of claim 9, wherein the non-GC features include at least one of: a number of files, a pre-compression size, a compression ratio, a storage system capacity, a number of replication bytes remaining, a number of replication bytes written, and an indicator of whether one or more disk failures have occurred.

15. The machine-readable medium of claim 9, wherein the GC features include at least one of: a total GC duration, a copy duration, a pre-enumeration duration, and an enumeration duration of GC processes performed at a plurality of storage systems.

16. The machine-readable medium of claim 9, wherein the regression algorithm is a random forest algorithm.

17. A data processing system, comprising:
a processor; and
a memory to store instructions, which when executed by the processor, cause the processor to perform operations of determining a garbage collection duration, the operations including
receiving a first set of garbage collection (GC) features and non-GC features associated with a storage system from a feature database, the first set of features being associated with a predetermined start date and a time window;
determining a learning equation, wherein the learning equation defines a function $f$ between a total enumeration duration of the latest completed GC process and a plurality of vectors of GC features and a plurality of vectors of non-GC features;
iteratively performing following operations:
for a current iteration representing a current GC process, determining whether a first prior GC process was started within the time window, and
populating an entry of vectors of the non-GC features of the learning equation based on corresponding feature values of the first set of non-GC features, in response to determining that the first prior GC process was started within the time window;
applying a predetermined regression algorithm to the learning equation to learn the function $f$ of the learning equation, the function $f$ being used to generate a GC duration predictive model, wherein the GC duration predictive model is utilized to predict a GC duration of a subsequent GC process; and
removing noise data from the feature database, wherein the noise data include statistic data collected from storage systems that are subjected to a stress testing and are underutilized.

18. The system of claim 17, wherein iteratively performing further comprises:
determining whether a date when a second prior GC process was completed is within the time window; and
populating an entry of vectors of the GC features of the learning equation based on corresponding feature values of the first set of GC features, in response to determining that the second prior GC process was completed is within the time window.

19. The system of claim 18, wherein the second prior GC process was performed before the first prior GC process.

20. The system of claim 17, wherein each vector of features comprises a plurality of vector entries, each vector entry corresponding to one of a plurality of days within the time window.

21. The system of claim 17, wherein the first set of garbage collection (GC) features and non-GC features is one of a plurality of sets of GC features and non-GC features determined based on prior operating statistics and GC processes of the storage system at different points in time.

22. The system of claim 17, wherein the non-GC features include at least one of: a number of files, a pre-compression size, a compression ratio, a storage system capacity, a number of replication bytes remaining, a number of replication bytes written, and an indicator of whether one or more disk failures have occurred.

23. The system of claim 17, wherein the GC features include at least one of: a total GC duration, a copy duration, a pre-enumeration duration, and an enumeration duration of GC processes performed at a plurality of storage systems.

24. The system of claim 17, wherein the regression algorithm is a random forest algorithm.

* * * * *